(12) United States Patent
Shimada et al.

(10) Patent No.: US 10,895,728 B2
(45) Date of Patent: Jan. 19, 2021

(54) OBSERVATION METHOD AND HOLDER FOR GEL-LIKE TRANSPARENT SAMPLE WHICH ENCLOSES AN OBSERVATION TARGET

(71) Applicant: OLYMPUS CORPORATION, Hachioji (JP)

(72) Inventors: Yoshihiro Shimada, Kanagawa (JP); Kazuhito Goda, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 168 days.

(21) Appl. No.: 16/186,303

(22) Filed: Nov. 9, 2018

(65) Prior Publication Data

US 2019/0146203 A1    May 16, 2019

(30) Foreign Application Priority Data

Nov. 14, 2017  (JP) .................................. 2017-218710

(51) Int. Cl.
*G02B 21/00*    (2006.01)
*G02B 21/02*    (2006.01)
*G02B 21/33*    (2006.01)

(52) U.S. Cl.
CPC ......... *G02B 21/33* (2013.01); *G02B 21/0088* (2013.01); *G02B 21/02* (2013.01)

(58) Field of Classification Search
CPC ............ G01N 1/28; G01N 1/286; G01N 1/36; G01N 2001/368; G02B 21/0088; G02B 21/24; G02B 21/26; G02B 21/32; G02B 21/33; G02B 21/34; G02B 21/36; G02B 21/361; G02B 21/362
USPC .................................................. 359/391–398
See application file for complete search history.

(56) References Cited

U.S. PATENT DOCUMENTS

| 2002/0163629 | A1* | 11/2002 | Switkes | G03F 7/2041 |
| | | | | 355/53 |
| 2005/0014254 | A1 | 1/2005 | Kruse | |
| 2007/0037281 | A1 | 2/2007 | Kruse | |
| 2011/0306122 | A1 | 12/2011 | Moritz et al. | |
| 2014/0212965 | A1 | 7/2014 | Kruse | |
| 2016/0084750 | A1* | 3/2016 | Wang | G02B 21/32 |
| | | | | 435/30 |

FOREIGN PATENT DOCUMENTS

| DE | 10362002 B4 | 10/2006 |
| JP | 5490803 B2 | 5/2014 |
| WO | 2017001680 A1 | 1/2017 |

* cited by examiner

*Primary Examiner* — Ryan S Dunning
(74) *Attorney, Agent, or Firm* — Holtz, Holtz & Volek PC

(57) ABSTRACT

Provided is a sample observation method including: bringing a gel-like transparent sample that encloses an observation target into contact with a transparent flat surface section of a substrate; and collecting light from the observation target by means of an objective lens via the substrate, in a state in which a pressing force is made to act in a direction in which the sample and the flat surface section relatively approach each other, until the contact area between the sample and the flat surface section comes to have a size allowing an effective light flux for the objective lens of a microscope to pass therethrough.

23 Claims, 9 Drawing Sheets

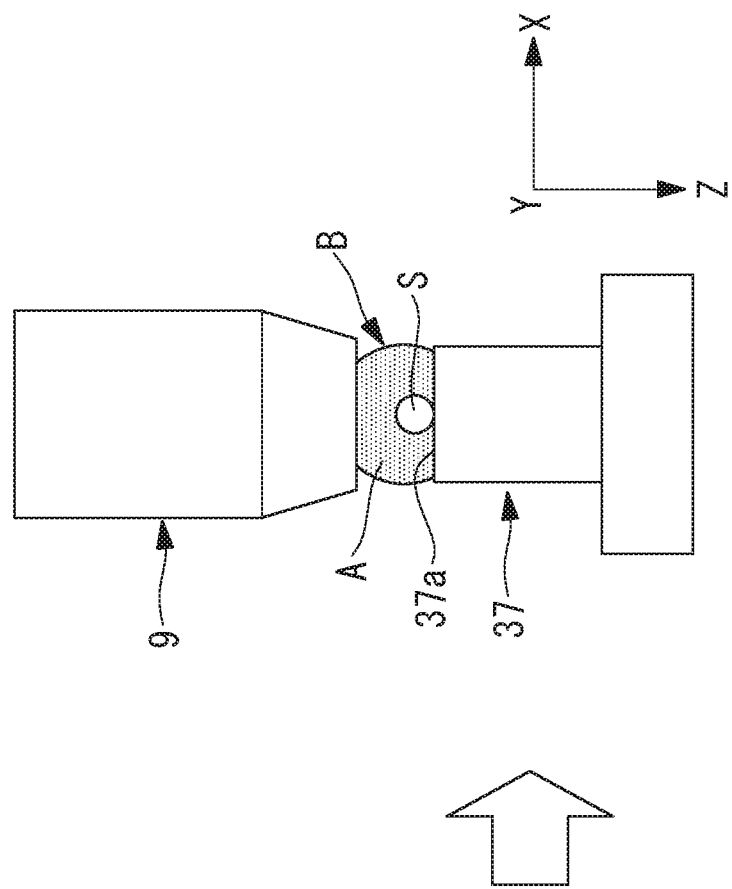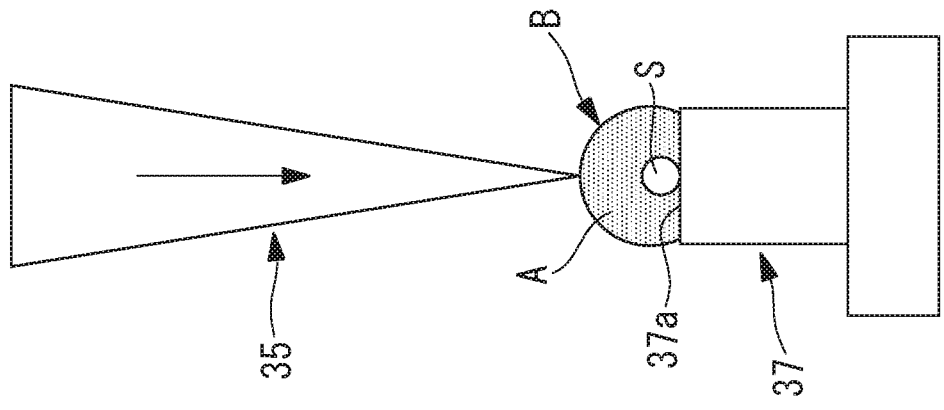

OBSERVATION METHOD AND HOLDER FOR GEL-LIKE TRANSPARENT SAMPLE WHICH ENCLOSES AN OBSERVATION TARGET

CROSS-REFERENCE TO RELATED APPLICATIONS

This application is based on Japanese Patent Application No. 2017-218710, the content of which is incorporated herein by reference.

TECHNICAL FIELD

The present invention relates to a sample observation method and a sample holder.

BACKGROUND ART

In recent years, a method has been focused, in which microscopic image data of a 3D-cultured cell, such as cellular aggregates, is obtained, screening is performed by using an image analysis technology, and drug efficacy is evaluated. Known as a method for forming a cellular aggregate, for example, is a method in which cells are dispensed, together with a culture solution, to an inner surface of a lid of a petri dish in the form of a droplet, this droplet is inverted to form a hanging drop, and cell aggregation is caused inside the hanging drop with the help of a component force of gravity, in the direction along the curved surface of the hanging drop (for example, see PTL 1). However, because hanging drops are not subjected to accurate array arrangement, it is clear that this method is not suitable for automation of preparation of cellular aggregates.

There is a known multiwall-plate structure that allows hanging drops suitable for automation to be formed, by improving this issue of PTL 1 (for example, see PTL 2). The multiwell plate described in PTL 2 is formed by arranging, in an array, sets each of which includes a hollow section that receives a liquid discharged from a dispenser, a hanging-drop forming compartment that forms and holds a hanging drop, and a duct that leads to the hollow section and the hanging-drop forming compartment. In the multiwell plate described in PTL 2, it is not necessary to invert droplets, unlike the method described in PTL 1, and hanging drops can be formed merely by dispensing cells and a culture solution from above the multiwell plate according to an array arrangement format, thereby facilitating automation of preparation of cellular aggregates in hanging drops. However, PTL 2 does not mention nothing about a high-definition observation method for a microscope, as in PTL 1.

Furthermore, because the shape of a hanging drop is formed of a curved surface, if the hanging drop is observed by means of a microscope, the curved surface shape of the hanging drop acts as a lens due to the refractive-index difference between the hanging drop and a substance (for example, air when a dry objective is used) that is interposed between the hanging drop and an objective lens, and optical aberrations occur, thus making it impossible to acquire a high-definition observation image. PTLs 1 and 2 do not mention nothing about a solution to this issue.

An adverse effect of the refractive-index difference on the observation prominently appears particularly when the substance interposed between the hanging drop and the objective lens is air. Thus, it is conceivable that the hanging drop is gelled, and the gelled hanging drop is immersed in a liquid and is observed, thereby reducing the refractive-index difference and suppressing the occurrence of aberrations; however, because the refractive indices of the liquid and the hanging drop gel are also strictly different, the original optical performance of the microscope cannot be obtained.

There is a known technique for achieving fine observation performed by a microscope and automation of image acquisition and the observation, by further developing the technique of PTL 2 (for example, see PTL 3). With the technique described in PTL 3, prepared cellular aggregates in hanging drops are dropped, together with the hanging drops, on wells of a multiwell plate, the bottom surfaces of the wells being flat, and light produced by each of the cellular aggregates is collected by an objective lens of an inverted microscope via the bottom surface of the corresponding well, thereby performing observation and image acquisition. The wells are designed with ingenuity; specifically, the transverse section of each of the wells is gradually narrowed downward, and the bottom surface of the well has a slightly larger size than the cellular aggregate (for example, 100 to 500 μm), for example, a shape having a size of about 1 mm in diameter, thereby making it possible to almost fix the XY-positions of the cellular aggregate dropped on the bottom surface (the positions in the directions intersecting the vertical direction). Accordingly, automation of the observation is achieved, and the influence of aberrations occurring on the curved surface of the hanging drop is reduced.

CITATION LIST

Patent Literature

{PTL 1} DE patent invention No. 10362002 specification
{PTL 2} Publication of Japanese Patent No. 5490803
{PTL 3} PCT International Publication No. WO 2017/001680

SUMMARY OF INVENTION

A first aspect of the present invention is directed to a sample observation method including: bringing a gel-like transparent sample that encloses an observation target into contact with a transparent flat surface section of a substrate; and collecting light from the observation target by means of an objective lens via the substrate, in a state in which a pressing force is made to act in a direction in which the sample and the flat surface section relatively approach each other, until the contact area between the sample and the flat surface section comes to have a size allowing an effective light flux for the objective lens of a microscope to pass therethrough.

A second aspect of the present invention is directed to a sample observation method including: bringing a gel-like transparent sample that encloses an observation target into contact with an objective lens of a microscope; and collecting light from the observation target by means of the objective lens, in a state in which a pressing force is made to act in the direction in which the sample and the objective lens relatively approach each other, until the contact area between the sample and the objective lens comes to have a size allowing an effective light flux for the objective lens to pass therethrough.

A third aspect of the present invention is directed to a sample holder including: a substrate that has a transparent flat surface section with which a gel-like transparent sample that encloses at least one observation target is brought into contact; and a contact-state maintaining unit that maintains a contact state in which the contact area between the sample and the flat surface section has a size allowing an effective light flux for an objective lens of a microscope to pass therethrough.

BRIEF DESCRIPTION OF DRAWINGS

FIG. 9 is a plan view for explaining a state in which a cellular aggregate in a droplet on a rod is observed, by a sample observation method according to a third embodiment of the present invention.

DESCRIPTION OF EMBODIMENTS

First Embodiment

A sample observation method and a sample holder according to a first embodiment of the present invention will be described below with reference to the drawings.

Figure 1:
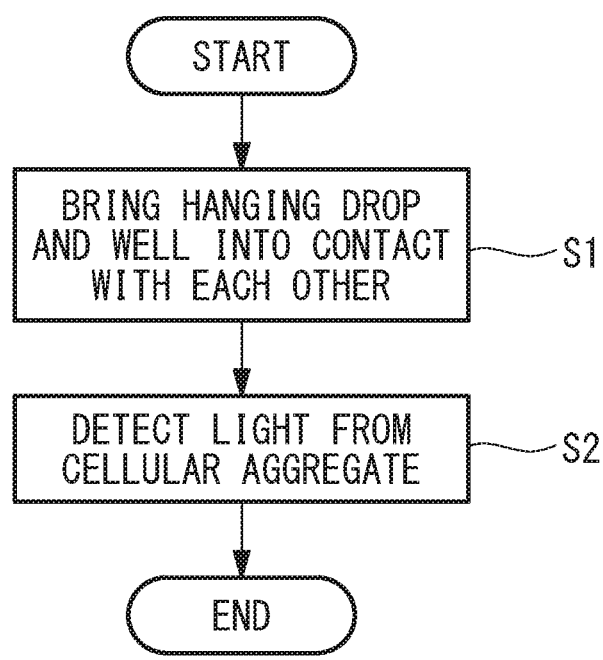
FIG. 1 is a flowchart for explaining a sample observation method according to a first embodiment of the present invention.
Figure 2:
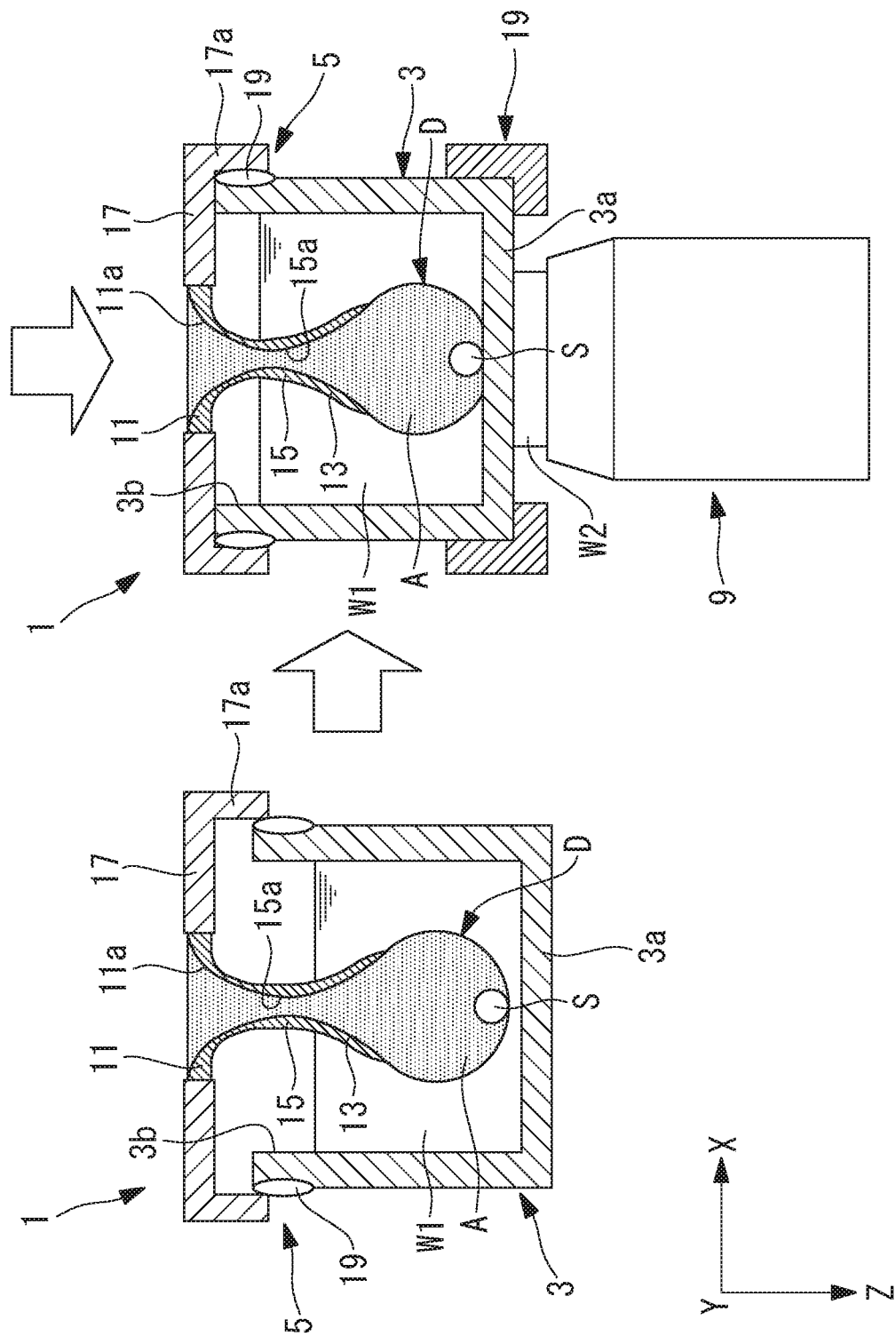
FIG. 2 is a longitudinal sectional view of a sample holder according to the first embodiment of the present invention.

As shown in the flowchart of FIG. 1 and in FIG. 2, the sample observation method of this embodiment includes: a step S1 of bringing a gel-like transparent hanging drop (sample) D that encloses at least one cellular aggregate (observation target) S into contact with a transparent flat bottom section (flat surface section) 3a of a well (substrate) 3; and a step S2 of collecting, in this state, light from the cellular aggregate S by means of an objective lens 9, detecting the light, and observing the cellular aggregate S.

The hanging drop D is, for example, in a state in which a droplet of a transparent sodium alginate solution A encloses at least one cellular aggregate S and is hung, at the time of gelation. Furthermore, for example, when a calcium solution is sprayed on the surface of the droplet of the sodium alginate solution A, thus being brought into contact therewith, the hanging drop D becomes a gel up to the vicinity of the periphery of the enclosed cellular aggregate S through a chemical reaction. The specific gravity of the sodium alginate solution A is 1 and is less than the specific gravity of the cellular aggregate S.

As shown in FIG. 2, for example, this sample observation method is performed by using a sample holder 7 that is provided with: a hanging-drop forming device (base material) 1 that forms and supports the hanging drop D; the well 3, which can accommodates the hanging drop D; and a positioning mechanism (contact-state maintaining means) 5 that maintains the hanging-drop forming device 1 in a state in which the hanging drop D and the bottom section 3a of the well 3 are brought into contact with each other.

The hanging-drop forming device 1 is provided with: a hollow section 11 into which the solution is injected; a hanging-drop forming compartment 13 that supports a droplet of the solution injected into the hollow section 11, in a hung state, with a cellular aggregate S being enclosed therein; and a thin duct 15 that connects the hollow section 11 and the hanging-drop forming compartment 13.

The hanging-drop forming device 1 may be constituted of one set of the hollow section 11, the hanging-drop forming compartment 13, and the duct 15 or may be a multiwell plate that is formed by arranging such sets in an array. FIG. 2 shows a hanging-drop forming device 1 that is formed of one set of the hollow section 11, the hanging-drop forming compartment 13, and the duct 15.

The hollow section 11 has an opening 11a that opens toward the opposite side from the duct 15 and has a substantially conical shape that is narrowed in a tapered manner from the opening 11a and that leads to the duct 15.

The hanging-drop forming compartment 13 has a substantially conical shape that gradually expands radially outward from the duct 15. The hanging-drop forming compartment 13 supports the droplet of the sodium alginate solution A, with a lower section thereof being exposed.

The duct 15 has a through-hole 15a that penetrates from the hollow section 11 to the hanging-drop forming compartment 13.

Furthermore, the hanging-drop forming device 1 is further provided with a flange 17 that bulges radially outward from the hollow section 11. The flange 17 supports the hollow section 11 and the hanging-drop forming compartment 13, with the hollow section 11 facing vertically upward and the hanging-drop forming compartment 13 facing vertically downward. Furthermore, the flange 17 has a fitting section 17a into which an opening 3b of the well 3 can be fitted, and can be disposed onto the opening 3b of the well 3 in a fitted state. Hereinafter, the vertical direction is referred to as Z-direction, and directions that intersect the Z-direction and that are perpendicular to each other are referred to as X-direction and Y-direction.

The well 3 is formed of a transparent material through which light can be transmitted. A transparentizing solution (liquid) W1 for making the hanging drop D and the cellular aggregate S transparent is accumulated in the well 3, for example. Furthermore, the well 3 is supported by a stage 19.

The positioning mechanism 5 is provided with an elastic member 21, such as rubber, that is attached to the opening 3b of the well 3 and that positions the flange 17 of the hanging-drop forming device 1, into which the opening 3b is fitted. The section of the opening 3b of the well 3 where the elastic member 21 is disposed is formed to be thicker than the other section of the opening 3b. In the positioning mechanism 5, when the elastic member 21 is fitted by means of the flange 17, the elastic member 21 is brought into close contact with an inner surface of the fitting section 17a of the flange 17 due to the elastic force thereof, thus making it possible to position the flange 17.

In Step S1, the hanging drop D, which is supported by the hanging-drop forming device 1, is immersed in the transparentizing solution W1 accumulated in the well 3. Then, the hanging drop D is brought into contact with the bottom section 3a of the well 3, a pressing force is made to act between the hanging drop D and the bottom section 3a of the well 3 in a direction in which they relatively approach each other, until the contact area between the hanging drop D and the bottom section 3a of the well 3 comes to have a size allowing an effective light flux for the objective lens 9 to pass therethrough, and the positioning mechanism 5 maintains that state.

In Step S2, for example, by means of an inverted light sheet microscope (not shown), excitation light that is collected in a planar manner along a plane perpendicular to the vertical direction is made incident from a lateral side of the hanging drop D and is radiated onto the cellular aggregate S. Then, of fluorescence that is produced in the cellular aggregate S, fluorescence that is emitted vertically downward from the lower section of the hanging drop D is collected by the objective lens 9 and is detected.

An immersion objective lens is used as the objective lens 9, for example. An immersion solution W2 is held due to a surface tension in a gap between a distal end of the objective lens 9 and the bottom section 3a of the well 3. By adopting the immersion objective lens, a higher-resolution observation image can be acquired.

The operation of the thus-configured sample observation method and sample holder 7 will now be described.

In order to observe a hanging drop D by using the sample observation method and the sample holder 7 of this embodiment, first, a gel-like hanging drop D that encloses a cellular aggregate S is formed by means of the hanging-drop forming device 1.

Specifically, cells (not shown) are dispensed, together with the sodium alginate solution A, to the hollow section 11 of the hanging-drop forming device 1 and are gravitationally moved to the hanging-drop forming compartment 13 via the through-hole 15a of the duct 15, thus being formed into a hanging drop D that is in a hung state of a droplet of the sodium alginate solution A enclosing the cells. Then, the cells are cultured inside the hanging drop D and are formed into a cellular aggregate S that is an observation target.

Because the sodium alginate solution A, which forms the hanging drop D, is less in specific gravity than the cellular aggregate S, the cellular aggregate S gravitationally settles down in the vicinity of the lowest point of the hanging drop D. Therefore, the amount of the sodium alginate solution A to be dispensed to the hollow section 11 is determined in advance, thereby making it possible to fix not only the positions of the cellular aggregate S in the X-direction and the Y-direction but also the position thereof in the Z-direction. Furthermore, by using the hanging-drop forming device 1, it is not necessary to invert the droplet of the sodium alginate solution A, in order to form the hanging drop D.

Next, a calcium solution is nebulized by a nebulizer device (not shown) or the like that nebulizes the calcium solution with ultrasound or through pressurization, for example, the nebulized calcium solution is brought into contact with the surface of the hanging drop D, which is supported by the hanging-drop forming device 1, and is made to penetrate the inside thereof, and the sodium alginate solution A is made to become a gel up to the vicinity of the periphery of the enclosed cellular aggregate S. Accordingly, a sample in which the position of the cellular aggregate S is fixed in the substantially transparent hanging drop D is prepared.

Then, as shown in FIG. 1, the hanging drop D, which is supported by the hanging-drop forming device 1, is immersed in the transparentizing solution W1 accumulated in the well 3, and transparentizing processing for making the hanging drop D and the cellular aggregate S transparent is applied thereto. The hanging drop D is immersed in a solution, such as the transparentizing solution W1, thereby making it also possible to suppress drying of the hanging drop D during observation.

Note that, when a large cellular aggregate S whose diameter exceeds 300 μm is observed, excitation light for observation does not reach the inside of the cellular aggregate S, thus making it impossible to observe the internal structure of the cellular aggregate S, in some cases. By applying the transparentizing processing, excitation light for observation can be made to easily reach the inside of the cellular aggregate S even when the cellular aggregate S is large. Accordingly, the internal structure of the cellular aggregate S can be easily observed, irrespective of the size of the cellular aggregate S.

Next, the lower section of the hanging drop D is brought into contact with the bottom section 3a of the well 3, and the hanging-drop forming device 1 is pushed to cause the elastic member 21 on the well 3 to be fitted by means of the flange 17 such that the contact area therebetween comes to have a size allowing an effective light flux for the objective lens 9 of the microscope to pass therethrough. Accordingly, the flange 17 is positioned due to the elastic force of the elastic member 21, thus maintaining a state in which the contact area between the hanging drop D and the bottom section 3a of the well 3 has a size allowing an effective light flux for the objective lens 9 of the microscope to pass therethrough.

Next, in this state, planar excitation light is made to enter the well 3 from the outside and is radiated onto the cellular aggregate S in the hanging drop D from a lateral side of the hanging drop D by means of the light sheet microscope, and fluorescence that is emitted vertically downward from the cellular aggregate S is collected by the objective lens 9 and is detected.

In this case, because the hanging drop D and the bottom section 3a of the well 3 are brought into contact with each other, and the contact area therebetween is maintained to have a size allowing an effective light flux for the objective lens 9 to pass therethrough, fluorescence that is produced in the cellular aggregate S in the hanging drop D is directly transmitted through the bottom section 3a of the well 3, without being transmitted through external air or liquid, and is collected by the objective lens 9.

Accordingly, it is possible reduce the refractive-index difference in the light path from the hanging drop D to the objective lens 9, to prevent the hanging drop D from acting as a lens even when the hanging drop D has a curved surface shape, and to suppress the occurrence of optical aberrations. For example, even in a case in which the gel-like sodium alginate solution A has a refractive index of about 1.33, and the transparentizing solution W1 has a refractive index of about 1.45, the occurrence of an optical deterioration can be prevented without being affected by the refractive-index difference therebetween. Furthermore, because it is a simple task to merely maintain a state in which the gel-like hanging drop D enclosing the cellular aggregate S and the bottom section 3a of the well 3 are brought into contact with each other, observation of the cellular aggregate S can be automated.

Therefore, according to the sample observation method and the sample holder 7 of this embodiment, it is possible to get the best from the original optical performance of the microscope, to enable high-definition observation and image acquisition of the cellular aggregate S performed by the microscope, and to facilitate automation of the observation.

Note that observation is performed by means of the light sheet microscope, thereby matching the focal position of the excitation light in the cellular aggregate S with a detection optical axis, and the focal plane of the objective lens 9 is matched with the incident plane of the excitation light, thereby making it possible to collect fluorescence that is produced in a wide range extending along the focal plane of the objective lens 9 at once by means of the objective lens 9, and to easily acquire a clear fluorescence image of an observation site of the cellular aggregate S.

Figure 3:
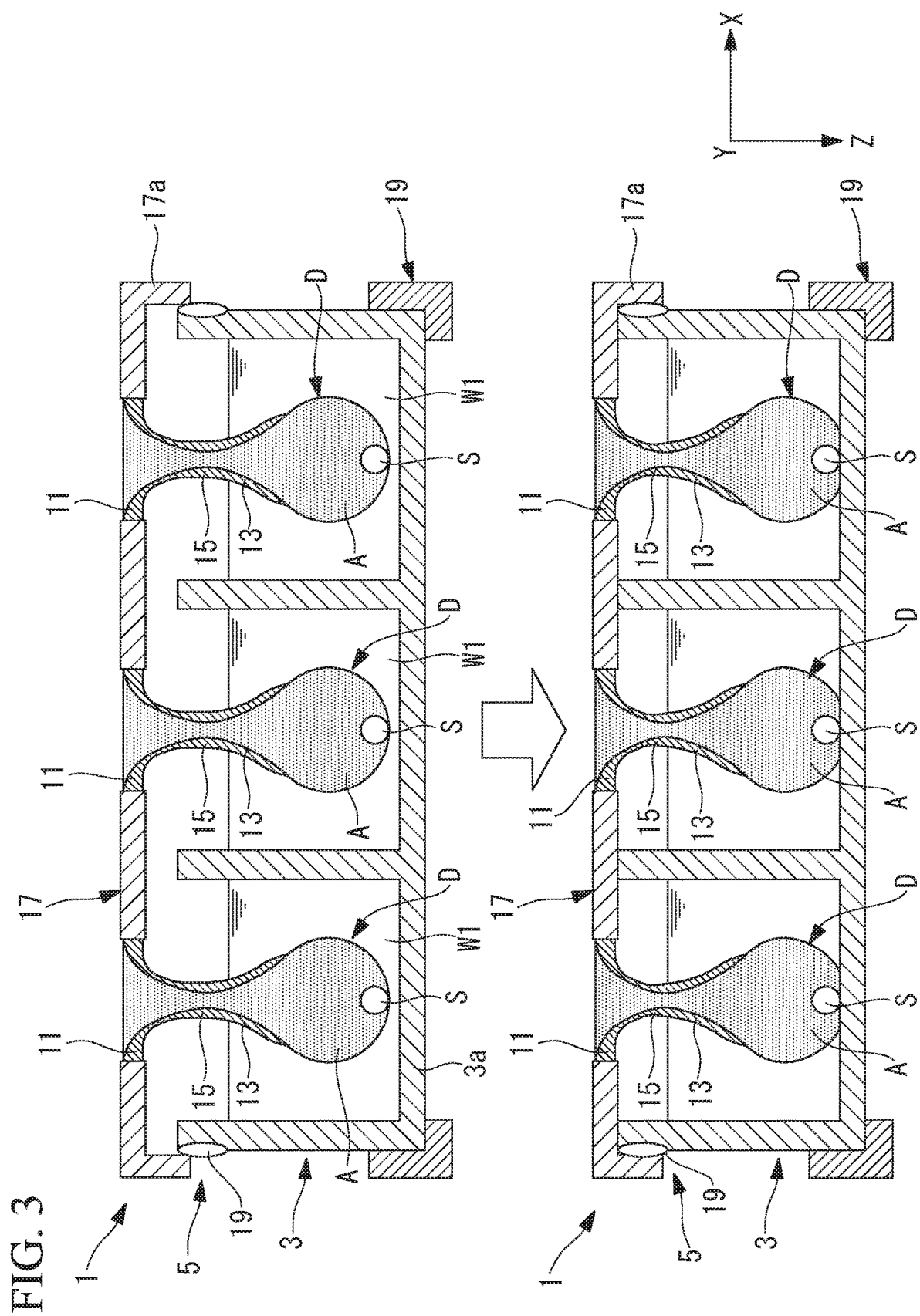
FIG. 3 is a longitudinal sectional view of a sample holder using a multiwell plate, according to a modification of the first embodiment of the present invention.

In this embodiment, as shown in FIG. 3, as the hanging-drop forming device 1, it is also possible to adopt a multiwell plate on which sets of the hollow sections 11, the hanging-drop forming compartments 13, and the ducts 15 are arranged in an array. By doing so, automatic dispensing is easy, and image acquisition of a large number of cellular aggregates S for the purpose of screening can be performed by high-throughput.

This embodiment can be modified as follows.

Figure 4:
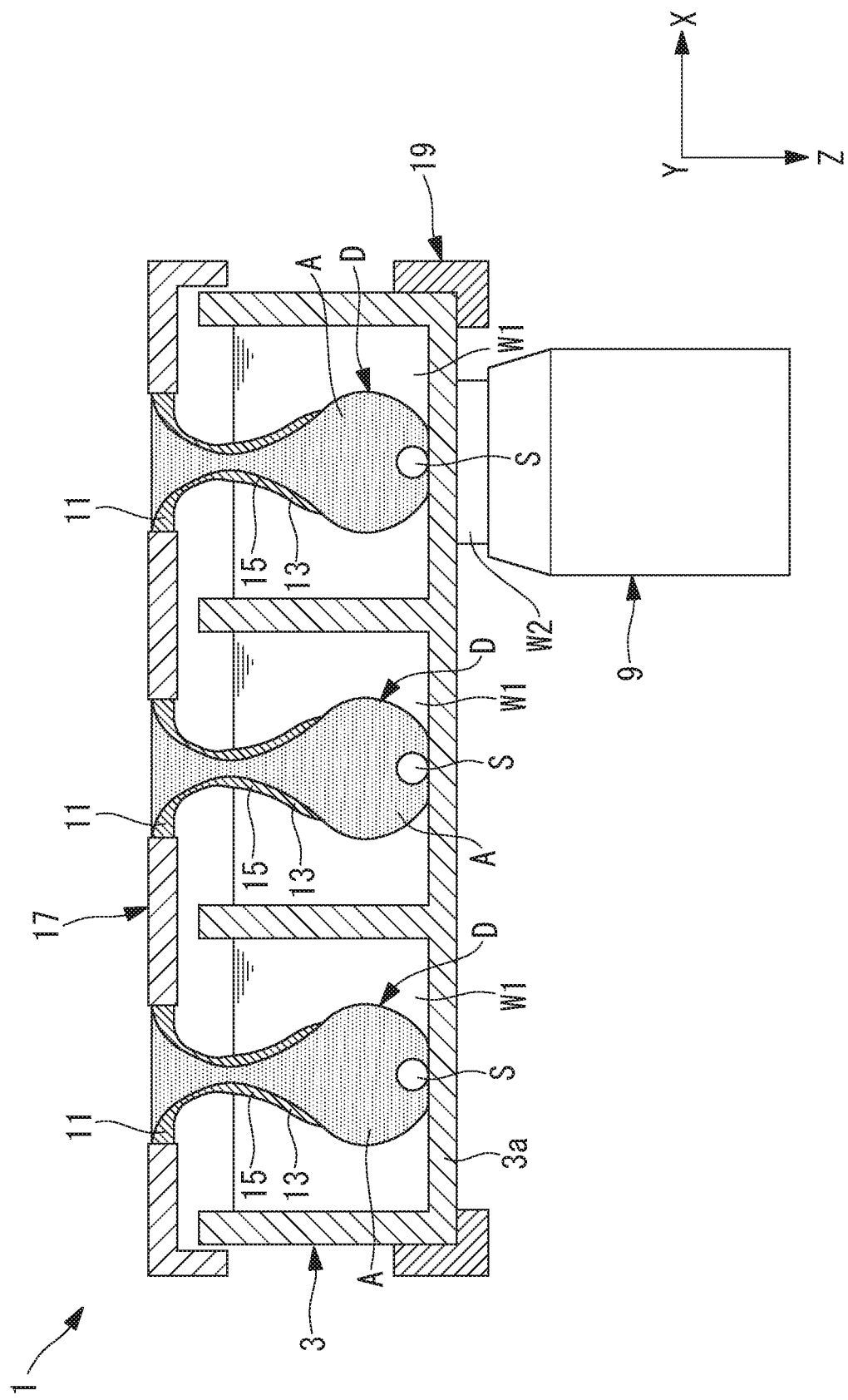
FIG. 4 is a longitudinal sectional view of a sample holder using a multiwell plate, according to a first modification of the first embodiment of the present invention.

In this embodiment, although the elastic member 21 is adopted as the positioning mechanism, in a first modification, for example, as shown in FIG. 4, the hanging drop D may be pressed against the bottom section 3a of the well 3 due to the self-weights of the hanging-drop forming device 1 and the flange 17, so as to ensure a contact area having a size allowing an effective light flux for the objective lens 9 to pass therethrough. FIG. 4 shows an example case in which a multiwell plate on which sets of the hollow sections 11, the hanging-drop forming compartments 13, and the ducts 15 are arranged in an array of 3×4 is adopted.

Figure 5A:
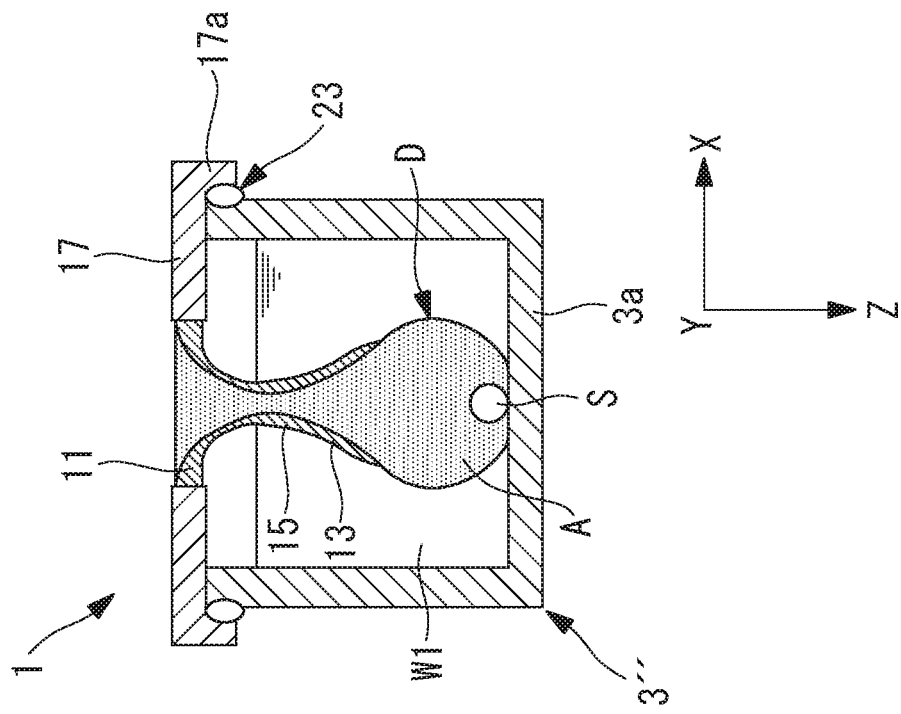
FIG. 5A is a longitudinal sectional view showing an example deep well for culturing or transparentizing, used in a sample observation method according to a second modification of the first embodiment of the present invention.
Figure 5B:
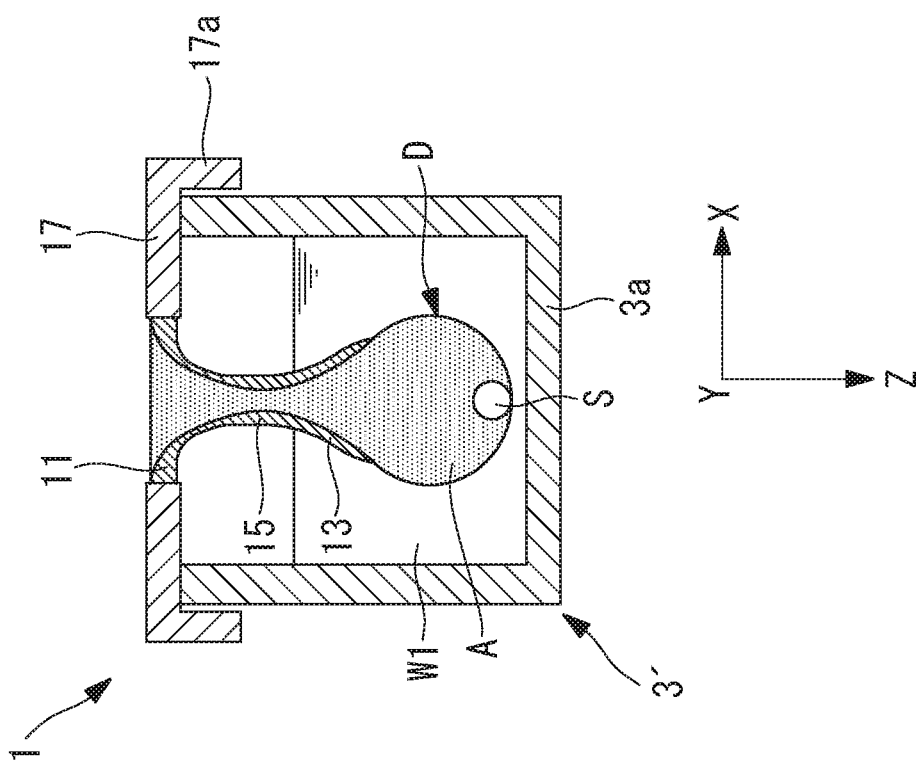
FIG. 5B is a longitudinal sectional view showing an example shallow well for observation, used in the sample observation method according to the second modification of the first embodiment of the present invention.

Furthermore, in a second modification, as shown in FIGS. 5A and 5B, two types of wells 3' and 3" that have different depths are prepared as substrates. The deep well 3', in which the hanging drop D is not brought into contact with the bottom section 3a, such as that shown in FIG. 5A, may be used when cells are cultured in the hanging drop D or when the hanging drop D and the cellular aggregate S are made to be transparent, and the shallow well 3", in which a sufficient contact area between the hanging drop D and the bottom section 3a can be ensured, such as that shown in FIG. 5B, may be used at the time of observation.

In this case, for example, it is also possible to provide a projection or a depression on the inner surface of the fitting section 17a of the flange 17, to provide a depression or a projection on the outer surface of the opening 3b of the shallow well 3", which is used for observation, shown in FIG. 5B, and to make these projection and depression function as a notch mechanism (positioning mechanism) 23. Then, the notch mechanism 23 enables to maintain a state in which the hanging drop D is pushed to ensure a sufficient contact area between the hanging drop D and the bottom section 3a of the well 3".

Furthermore, in a third modification, the hanging drop D may not be immersed in the transparentizing solution W1 in the well 3.

Figure 6:
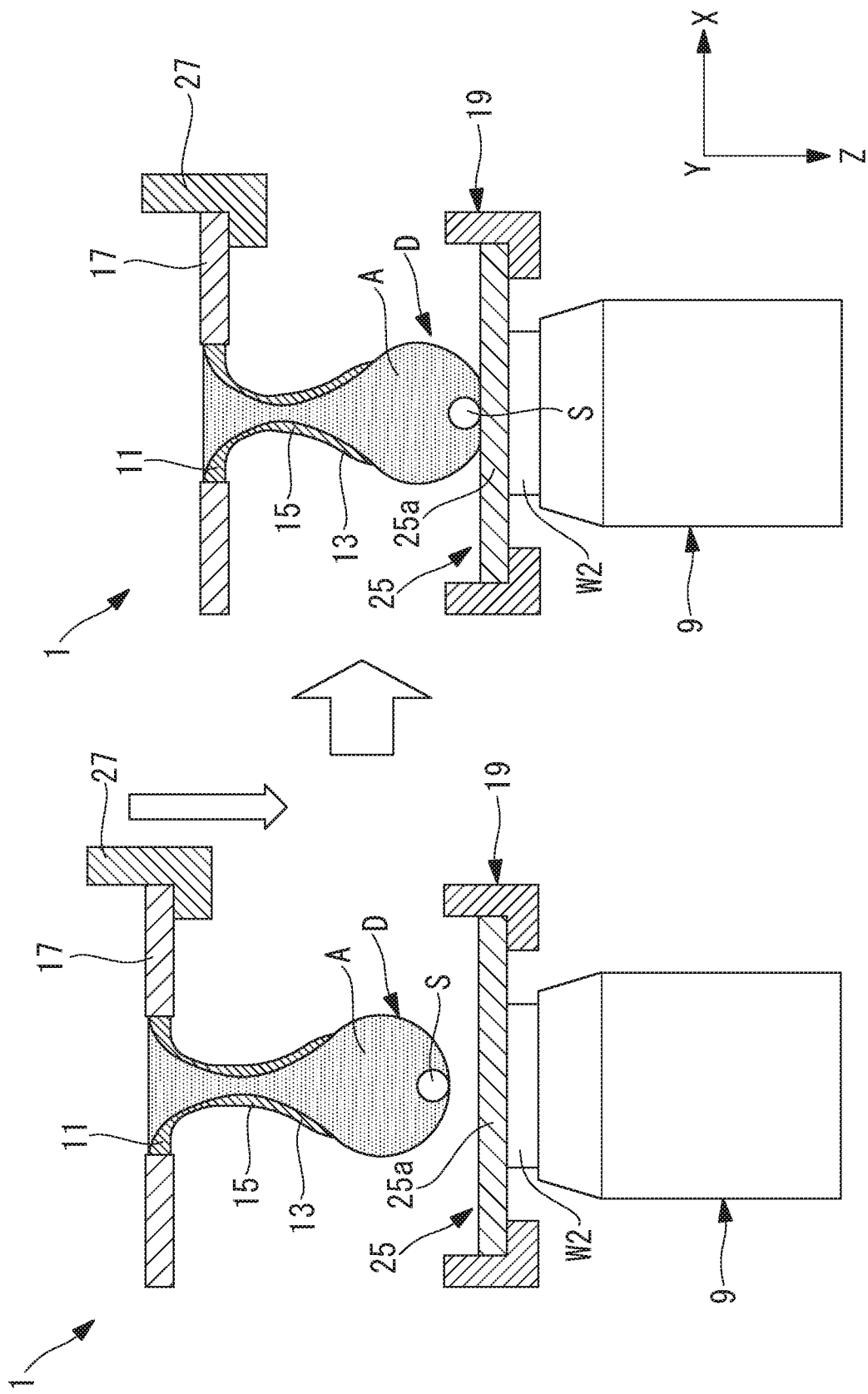
FIG. 6 is a longitudinal sectional view of a sample holder using a slide glass, according to a third modification of the first embodiment of the present invention.

In this case, for example, as shown in FIG. 6, it is also possible to adopt, as the substrate, a slide glass 25 that has a transparent flat surface section 25a, to press the hanging drop D, which is supported by the hanging-drop forming device 1, against the flat surface section 25a from above the slide glass 25, and to ensure a contact area having a size allowing an effective light flux for the objective lens 9 to pass therethrough. In this case, for example, it is also possible to support the slide glass 25 by means of the stage 19, to grasp the flange 17 by means of a robot hand (positioning mechanism) 27 or the like, and to maintain a contact state between the hanging drop D and the flat surface section 25a of the slide glass 25.

Second Embodiment

Next, a sample observation method and a sample holder according to a second embodiment of the present invention will be described.

Figure 7:
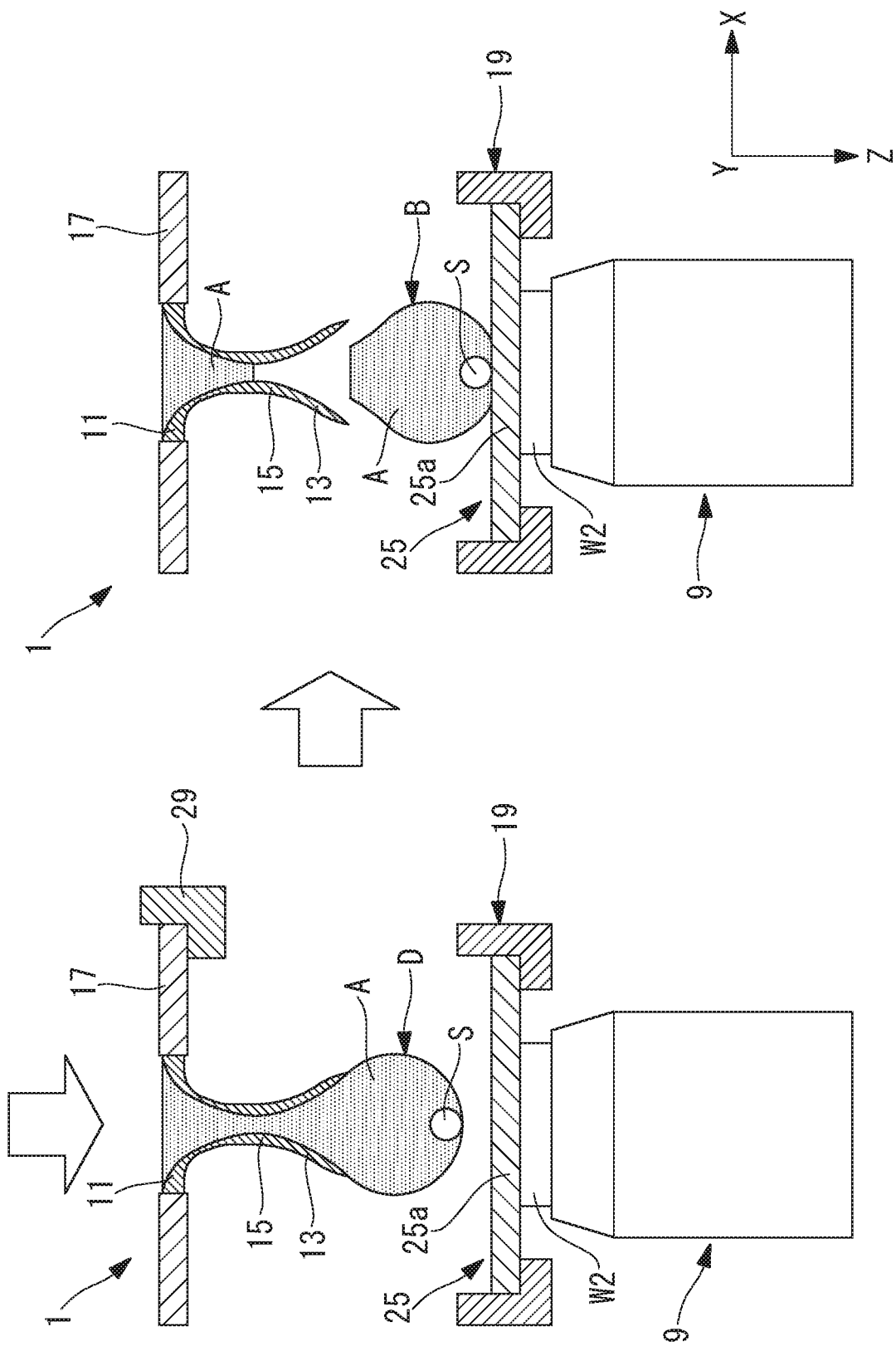
FIG. 7 is a longitudinal sectional view of a hanging-drop forming device etc. for dropping a hanging drop by a sample observation method according to a second embodiment of the present invention.

The sample observation method and the sample holder of this embodiment differ from those of the first embodiment in that a slide glass 25 that has a transparent flat surface section 25a is adopted as the substrate, instead of the well 3, and the hanging drop D is dropped on the slide glass 25, thus bringing the hanging drop D into contact with the flat surface section 25a, as shown in FIG. 7, for example.

Hereinafter, identical reference signs are assigned to configurations common to those in the sample observation method and the sample holder 7 of the first embodiment, and a description thereof will be omitted.

As shown in FIG. 7, in the sample observation method of this embodiment, the hanging-drop forming device 1, which supports the hanging drop D, is vibrated by a vibrator 29, such as an ultrasound transducer, thus dropping the hanging drop D on the slide glass 25. Accordingly, a gel-like transparent droplet (sample) B of the sodium alginate solution A, which had formed the hanging drop D, and the flat surface section 25a of the slide glass 25 are brought into contact with each other, and the contact area between the droplet B and the flat surface section 25a is formed due to the self-weight of the droplet B.

Then, in a state in which the contact area with the bottom section 3a of the well 3 is maintained to have a size allowing an effective light flux for the objective lens 9 to pass therethrough, due to the self-weight of the droplet B of the sodium alginate solution A, light from the cellular aggregate S enclosed in the droplet B is collected by the objective lens 9 and is detected, and the cellular aggregate S is observed.

Therefore, according to the sample observation method of this embodiment, in a case in which the flexibility of the gel-like hanging drop D is high, a contact area having a sufficient size allowing an effective light flux for the objective lens 9 to pass therethrough can be formed between the dropped gel-like droplet B and the flat surface section 25a of the slide glass 25, by a simple method in which the hanging drop D is merely dropped on the slide glass 25.

Figure 8:
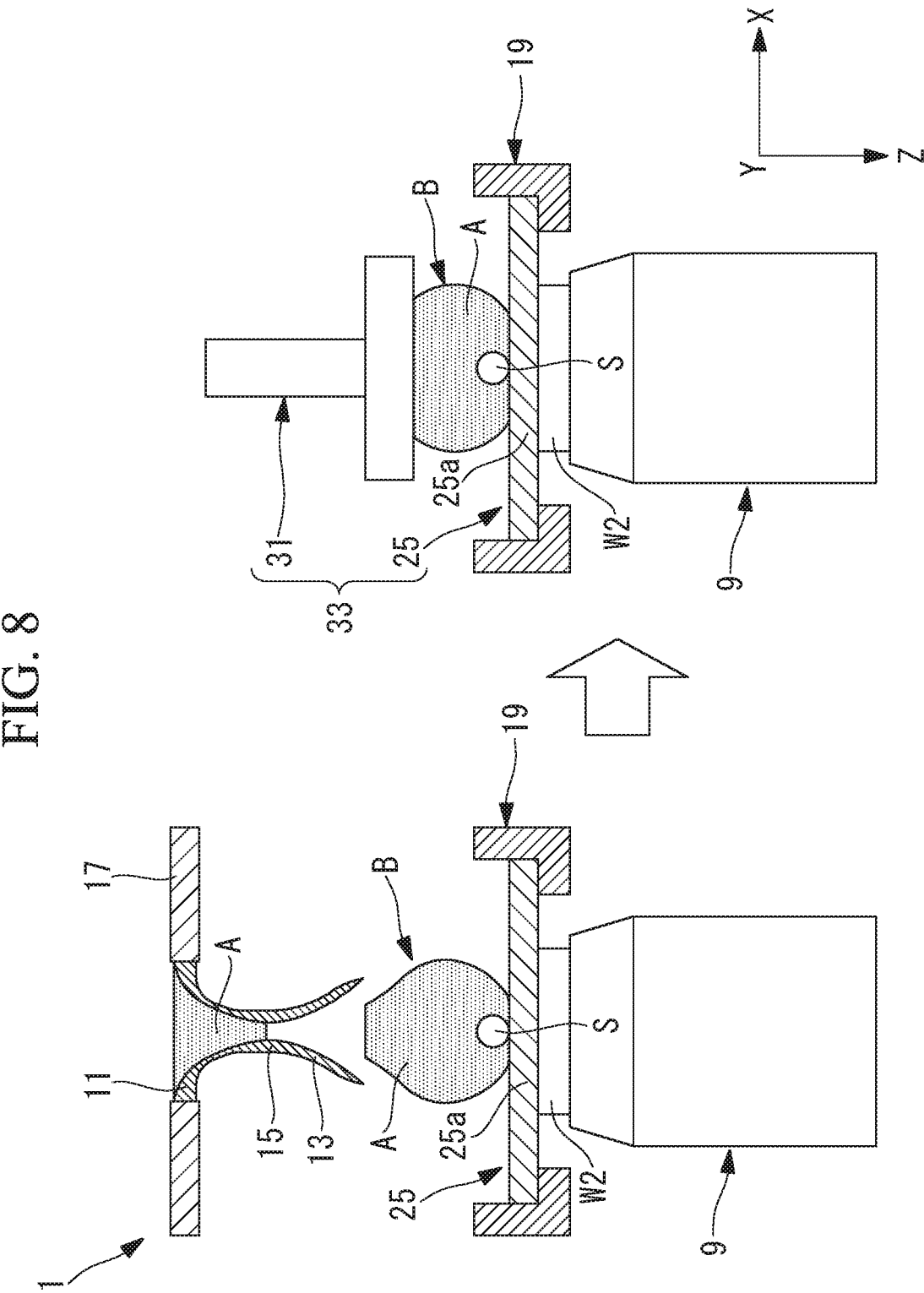
FIG. 8 is a longitudinal sectional view of a sample holder according to a modification of the second embodiment of the present invention.

In this embodiment, as shown in FIG. 8, it is also possible to adopt, as the contact-state maintaining means, a pressing member (contact-state maintaining means) 31 that presses the gel-like droplet B of the sodium alginate solution A against the flat surface section 25a of the slide glass 25 in the pressing direction. The slide glass 25 and the pressing member 31 constitute a sample holder 33.

By doing so, even in a case in which a sufficient contact area with the flat surface section 25a of the slide glass 25 cannot be ensured only due to the self-weight of the gel-like droplet B, it is possible to press the gel-like droplet B against the flat surface section 25a of the slide glass 25 by means of the pressing member 31, to ensure a contact area having a size allowing an effective light flux for the objective lens 9 to pass therethrough, and to maintain that state.

Third Embodiment

Next, a sample observation method according to a third embodiment of the present invention will be described.

The sample observation method and the sample holder of this embodiment differ from those of the first embodiment in that the gel-like transparent droplet (sample) B of the sodium alginate solution A is brought into contact with the objective lens 9, without adopting the substrate, as shown in FIG. 9, for example.

Hereinafter, identical reference signs are assigned to configurations common to those in the sample observation methods of the first embodiment and the second embodiment, and a description thereof will be omitted.

In the sample observation method of this embodiment, as shown in FIG. 9, a dispenser 35 is used to dispense the sodium alginate solution A, together with cells, on an end face 37a of a rod 37, thus forming a droplet B on the end face 37a, and the cells are cultured in the droplet B to form a cellular aggregate S that is an observation target. Then, a calcium solution is sprayed on the droplet B on the end face 37a of the rod 37, to make the calcium solution penetrate inside thereof, thus making the droplet B become a gel up to the vicinity of the periphery of the enclosed cellular aggregate S.

Next, an objective lens 9 that has an optical design conforming to the refractive index of the gel-like sodium alginate solution A is disposed so as to be directed vertically downward, and the rod 37 is moved by using a movement mechanism (not shown) to press the gel-like droplet B against the objective lens 9 from below. Then, in a state in which the pressing force is made to act in the direction in which the gel-like droplet B approaches the objective lens 9, until the contact area between the gel-like droplet B and the objective lens 9 comes to have a size allowing an effective light flux for the objective lens 9 to pass therethrough, fluorescence from the cellular aggregate S is collected by the objective lens 9, and the cellular aggregate S is observed.

In this case, due to the elastic force of the gel-like droplet B, the pressing amount is changed within the range of the elastic force, thereby making it possible to change the focal point of the objective lens 9 in the optical-axis direction. Then, observation is performed while maintaining a state in which the contact area between the gel-like droplet B and the objective lens 9 has a size allowing an effective light flux for the objective lens 9 to pass therethrough, thereby making it possible to reduce the refractive-index difference in the light path from the gel-like droplet B to the objective lens 9, to prevent the droplet B from acting as a lens even when the gel-like droplet B has a curved surface shape, and to suppress the occurrence of optical aberrations.

Therefore, according to the sample observation method of this embodiment, it is possible to get the best from the original optical performance of the microscope, without using the substrate, such as the well 3, to enable high-definition observation and image acquisition of the cellular aggregate S performed by the microscope, and to facilitate automation of the observation.

Although the embodiments of the present invention have been described in detail above with reference to the drawings, the specific configurations are not limited to the embodiments, and design changes etc. that do not depart from the scope of the present invention are also encompassed. For example, without being limited to those applied to the above-described embodiments and modifications, the present invention can also be applied an embodiment obtained by appropriately combining these embodiments and modifications and is not particularly limited.

Furthermore, for example, in the first embodiment, the well 3 has the bottom section 3a, which is transparent over the whole area thereof, and, in the second embodiment, the slide glass 25 has the flat surface section 25a, which is transparent over the whole area thereof; however, the bottom section of the well 3 and the flat surface section of the slide glass 25 do not need to be transparent over the whole areas thereof, and the bottom section of the well 3 and the slide glass 25 may each have partially a transparent flat surface section having a size allowing fluorescence from the cellular aggregate S to be transmitted.

The following aspects are also derived from the above-described embodiments.

According to a first aspect, the present invention provides a sample observation method including: bringing a gel-like transparent sample that encloses an observation target into contact with a transparent flat surface section of a substrate; and collecting light from the observation target by means of an objective lens via the substrate, in a state in which a pressing force is made to act in a direction in which the sample and the flat surface section relatively approach each other, until the contact area between the sample and the flat surface section comes to have a size allowing an effective light flux for the objective lens of a microscope to pass therethrough.

According to this aspect, the sample and the flat surface section of the substrate are brought into contact with each other, and a state in which the contact area therebetween has a size allowing an effective light flux for the objective lens of the microscope to pass therethrough is maintained, thus causing light produced in the observation target in the sample to be directly transmitted through the flat surface section of the substrate from the sample, without being transmitted through external air or liquid, and to be collected by the objective lens.

Accordingly, it is possible reduce the refractive-index difference in the light path from the sample to the objective lens, to prevent the sample from acting as a lens even when the sample has a curved surface shape, and to suppress the occurrence of optical aberrations. Furthermore, because it is a simple task to merely maintain a state in which the gel-like sample enclosing the observation target and the flat surface section of the substrate are brought into contact with each other, observation of the sample can be automated. Therefore, it is possible to get the best from the original optical performance of the microscope, to enable high-definition observation and image acquisition of the observation target performed by the microscope, and to facilitate automation of the observation.

According to a second aspect, the present invention provides a sample observation method including: bringing a gel-like transparent sample that encloses an observation target into contact with an objective lens of a microscope; and collecting light from the observation target by means of the objective lens, in a state in which a pressing force is made to act in the direction in which the sample and the objective lens relatively approach each other, until the contact area between the sample and the objective lens comes to have a size allowing an effective light flux for the objective lens to pass therethrough.

According to this aspect, the sample and the objective lens are brought into contact with each other, and a state in which the contact area therebetween has a size allowing an effective light flux for the objective lens to pass therethrough is maintained, thus causing light produced in the observation target in the sample to be directly incident on the objective lens from the sample, without being transmitted through external air or liquid, and to be collected.

Accordingly, it is possible to reduce the refractive-index difference in the light path from the sample to the objective lens, to prevent the sample from acting as a lens even when the sample has a curved surface shape, and to suppress the occurrence of optical aberrations. Furthermore, because it is a simple task to merely maintain a state in which the gel-like sample enclosing the observation target and the objective lens are brought into contact with each other, observation of the sample can be automated. Therefore, it is possible to get the best from the original optical performance of the microscope, to enable high-definition observation and image acquisition of the observation target performed by the microscope, and to facilitate automation of the observation.

In the above-described first aspect, a base material may support the sample in a state in which the sample is brought into contact with the flat surface section.

With this configuration, the base material can maintain a state in which the sample is brought into contact with the substrate, in a stable orientation.

In the above-described first aspect, the sample may be dropped on the substrate, thus being brought into contact with the flat surface section.

With this configuration, the contact area between the sample and the substrate can be formed due to the self-weight of the sample.

In this case, the base material may be vibrated from the state in which the base material supports the sample, thereby dropping the sample.

With this configuration, the sample, which is supported by the base material, can be dropped on the substrate by a simple method.

In the above-described first aspect, the substrate may have a form capable of accumulating a liquid therein; and the sample and the flat surface section may be brought into contact with each other in a state in which at least one section of the sample is immersed in the liquid accumulated in the substrate.

With this configuration, it is possible to suppress drying of the sample during observation.

In this case, the liquid is a transparentizing solution for making the sample transparent.

With this configuration, it is possible to facilitate observation of the observation target enclosed in the sample.

In each of the above-described aspects, the pressing force may be made to occur due to gravity.

With this configuration, a member for forming the contact area between the sample and the substrate or the objective lens becomes unnecessary, thus making it possible to simplify the configuration. This configuration is effective when the gel-like sample has a sufficient flexibility.

In each of the above-described aspects, the microscope may be an inverted microscope.

In the above-described aspect, the objective lens may be an immersion objective lens.

By adopting an immersion objective lens, it is possible to acquire a higher-resolution observation image.

In each of the above-described aspects, the sample may be formed by causing a gel-like transparent droplet to gel in a state in which the observation target is enclosed therein.

In each of the above-described aspects, the sample is formed by causing a hanging drop to gel, the hanging drop being in a state in which the droplet is hung.

With this configuration, a sample in which the position of the observation target is fixed in the transparent hanging drop is prepared. Therefore, light produced in the observation target in the sample is detected outside the sample, thus making it possible to observe the observation target with high-definition.

In each of the above-described aspects, the observation target is a cellular aggregate formed when a plurality of cells aggregate.

According to a third aspect, the present invention provides a sample holder including: a substrate that has a transparent flat surface section with which a gel-like transparent sample that encloses at least one observation target is brought into contact; and a contact-state maintaining unit that maintains a contact state in which the contact area between the sample and the flat surface section has a size allowing an effective light flux for an objective lens of a microscope to pass therethrough.

According to this aspect, the sample and the flat surface section of the substrate are brought into contact with each other, and the contact-state maintaining means maintains a contact state in which the contact area therebetween has a size allowing an effective light flux for the objective lens of the microscope to pass therethrough, thereby making it possible to cause light produced in the observation target in the sample to be directly transmitted through the flat surface section of the substrate from the sample, without being transmitted through external air or liquid, and to be collected by the objective lens.

Accordingly, it is possible to reduce the refractive-index difference in the light path from the sample to the objective lens, to prevent the sample from acting as a lens even when the sample has a curved surface shape, and to suppress the occurrence of optical aberrations. Furthermore, because it is a simple task to merely maintain a state in which the gel-like sample enclosing the observation target and the substrate are brought into contact with each other, observation of the sample can be automated. Therefore, it is possible to get the best from the original optical performance of the microscope, to enable high-definition observation and image acquisition of the observation target performed by the microscope, and to facilitate automation of the observation.

In the above-described third aspect, the contact-state maintaining unit may be a pressing member that presses the sample in a direction in which the sample is pressed against the flat surface section.

With this configuration, even in a case in which a sufficient contact area between the sample and the substrate cannot be ensured merely by the self-weight of the sample, a sufficient contact area can be ensured by pressing the sample against the flat surface section of the substrate by means of the pressing member.

The above-described third aspect may further include a base material that supports the sample in a state in which the sample is brought into contact with the flat surface section.

With this configuration, it is possible to form the contact area between the sample and the substrate, with the sample being in a stable orientation.

In the above-described third aspect, the base material can support a droplet in a hung state, with the droplet enclosing the observation target; and the sample is formed by causing the droplet, which is supported by the base material, to gel.

With this configuration, a sample that is in a hung state and in which the position of the enclosed observation target is fixed is prepared. Therefore, light produced in the observation target in the sample is detected outside the sample, thus making it possible to observe the observation target with high-definition.

In the above-described third aspect, the substrate may have a form capable of accumulating a liquid therein and capable of immersing at least one section of the sample in the liquid accumulated in the substrate.

With this configuration, the sample and the flat surface section of the substrate are brought into contact with each other in a state in which at least one section of the sample is immersed in the liquid accumulated in the substrate, thus making it possible to suppress drying of the sample during observation.

In the above-described third aspect, the contact-state maintaining unit may be a positioning mechanism capable of positioning the base material in a state in which the sample and the flat surface section are brought into contact with each other.

With this configuration, due to the positioning mechanism, it is possible to ensure a sufficient contact area between the sample and the substrate while the base material maintains the sample in a stable orientation.

In the above-described third aspect, the positioning mechanism may be configured so as to be capable of positioning the sample and the flat surface section at at least two relative positions in a contact state and a non-contact state.

With this configuration, due to the positioning mechanism, it is possible to bring the sample and the flat surface section of the substrate into contact with each other and to maintain the state, with ease and accuracy.

In the above-described third aspect, a plurality of substrates may be arranged in an array.

With this configuration, it is possible to observe and acquire images of a plurality of observation targets at once, thus making it possible to achieve the efficiency of observation and image acquisition.

According to the present invention, an advantageous effect is afforded in that it is possible to get the best from the original optical performance of the microscope, to enable high-definition observation and image acquisition of a cellular aggregate performed by the microscope, and to facilitate automation of the observation.

REFERENCE SIGNS LIST 1 hanging-drop forming device (base material)
3, 3" well (substrate)
3a bottom section (flat surface section)
5 positioning mechanism (contact-state maintaining unit)
7, 33 sample holder
9 objective lens
23 notch mechanism (positioning mechanism, contact-state maintaining unit)
25 slide glass (substrate)
25a flat surface section
31 pressing member (contact-state maintaining unit)
B droplet (sample)
D hanging drop (sample)
S cellular aggregate (observation target)
W1 transparentizing solution (liquid)

The invention claimed is:

1. A sample observation method comprising:
bringing a gel-like transparent sample that encloses an observation target into contact with a transparent flat surface section of a substrate; and
collecting light from the observation target by means of an objective lens of a microscope via the substrate, in a state in which a pressing force is made to act in a direction in which the sample and the flat surface section relatively approach each other, until a contact area between the sample and the flat surface section comes to have a size allowing an effective light flux for the objective lens to pass therethrough,
wherein the pressing force is made to occur due to gravity.

2. The sample observation method according to claim 1, wherein a base material supports the sample in a state in which the sample is brought into contact with the flat surface section.

3. The sample observation method according to claim 1, wherein the microscope is an inverted microscope.

4. The sample observation method according to claim 1, wherein the objective lens is an immersion objective lens.

5. The sample observation method according to claim 1, wherein the sample is formed by causing a transparent droplet to gel in a state in which the observation target is enclosed therein.

6. The sample observation method according to claim 1, wherein the observation target is a cellular aggregate formed when a plurality of cells aggregate.

7. A sample observation method comprising:
bringing a gel-like transparent sample that encloses an observation target into contact with an objective lens of a microscope; and
collecting light from the observation target by means of the objective lens, in a state in which a pressing force is made to act in a direction in which the sample and the objective lens relatively approach each other, until a contact area between the sample and the objective lens comes to have a size allowing an effective light flux for the objective lens to pass therethrough,
wherein the pressing force is made to occur due to gravity.

8. The sample observation method according to claim 7, wherein the microscope is an inverted microscope.

9. The sample observation method according to claim 7, wherein the objective lens is an immersion objective lens.

10. The sample observation method according to claim 7, wherein the sample is formed by causing a transparent droplet to gel in a state in which the observation target is enclosed therein.

11. The sample observation method according to claim 7, wherein the observation target is a cellular aggregate formed when a plurality of cells aggregate.

12. A sample observation method comprising:
bringing a gel-like transparent sample that encloses an observation target into contact with a transparent flat surface section of a substrate; and
collecting light from the observation target by means of an objective lens of a microscope via the substrate, in a state in which a pressing force is made to act in a direction in which the sample and the flat surface section relatively approach each other, until a contact area between the sample and the flat surface section comes to have a size allowing an effective light flux for the objective lens to pass therethrough,
wherein the sample is dropped on the substrate, thus being brought into contact with the flat surface section.

13. The sample observation method according to claim 12, wherein a base material is vibrated from a state in which the base material supports the sample, thereby dropping the sample.

14. A sample observation method comprising:
bringing a gel-like transparent sample that encloses an observation target into contact with a transparent flat surface section of a substrate; and collecting light from the observation target by means of an objective lens of a microscope via the substrate, in a state in which a pressing force is made to act in a direction in which the sample and the flat surface section relatively approach each other, until a contact area between the sample and the flat surface section comes to have a size allowing an effective light flux for the objective lens to pass therethrough, wherein the substrate has a form capable of accumulating a liquid therein; and wherein the sample and the flat surface section are brought into contact with each other in a state in which at least one section of the sample is immersed in liquid accumulated in the substrate.

15. The sample observation method according to claim 14, wherein the liquid accumulated in the substrate is a transparentizing solution for making the sample transparent.

16. A sample observation method comprising:

bringing a gel-like transparent sample that encloses an observation target into contact with a transparent flat surface section of a substrate; and collecting light from the observation target by means of an objective lens of a microscope via the substrate, in a state in which a pressing force is made to act in a direction in which the sample and the flat surface section relatively approach each other, until a contact area between the sample and the flat surface section comes to have a size allowing an effective light flux for the objective lens to pass therethrough, wherein the sample is formed by causing a hanging drop to gel, the hanging drop being a transparent droplet, in which the observation target is enclosed, in a state in which the droplet is hung.

17. A sample observation method comprising:

bringing a gel-like transparent sample that encloses an observation target into contact with an objective lens of a microscope; and collecting light from the observation target by means of the objective lens, in a state in which a pressing force is made to act in a direction in which the sample and the objective lens relatively approach each other, until a contact area between the sample and the objective lens comes to have a size allowing an effective light flux for the objective lens to pass therethrough, wherein the sample is formed by causing a hanging drop to gel, the hanging drop being a transparent droplet, in which the observation target is enclosed, in a state in which the droplet is hung.

18. A sample holder comprising:

a substrate that has a transparent flat surface section with which a gel-like transparent sample that encloses at least one observation target is brought into contact;

a contact-state maintaining unit that maintains a contact state in which a contact area between the sample and the flat surface section has a size allowing an effective light flux for an objective lens of a microscope to pass therethrough; and a base material that supports the sample in a state in which the sample is brought into contact with the flat surface section, wherein the base material can support a droplet in a hung state, with the droplet enclosing the observation target; and the sample is formed by causing the droplet, which is supported by the base material, to gel.

19. The sample holder according to claim 18, wherein the contact-state maintaining unit comprises a pressing member that presses the sample in a direction in which the sample is pressed against the flat surface section.

20. The sample holder according to claim 18, wherein the contact-state maintaining unit comprises a positioning mechanism capable of positioning the base material in a state in which the sample and the flat surface section are brought into contact with each other.

21. The sample holder according to claim 20, wherein the positioning mechanism is configured so as to be capable of positioning the sample and the flat surface section at at least two relative positions in a contact state and a non-contact state.

22. The sample holder according to claim 18, wherein a plurality of substrates are arranged in an array.

23. A sample holder comprising:

a substrate that has a transparent flat surface section with which a gel-like transparent sample that encloses at least one observation target is brought into contact;

a contact-state maintaining unit that maintains a contact state in which a contact area between the sample and the flat surface section has a size allowing an effective light flux for an objective lens of a microscope to pass therethrough; and a base material that supports the sample in a state in which the sample is brought into contact with the flat surface section, wherein the substrate has a form capable of accumulating a liquid therein and capable of immersing at least one section of the sample in liquid accumulated in the substrate.

* * * * *